United States Patent
Owechko (10) Patent No.: US 10,785,903 B2
(45) Date of Patent: Sep. 29, 2020

(54) SYSTEM AND METHOD FOR DETERMINING CROP RESIDUE FRACTION USING BLIND SOURCE SEPARATION OF COLOR IMAGES

(71) Applicant: HRL Laboratories, LLC, Malibu, CA (US)

(72) Inventor: Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 28 days.

(21) Appl. No.: 16/298,002

(22) Filed: Mar. 11, 2019

(65) Prior Publication Data

US 2019/0313570 A1    Oct. 17, 2019

Related U.S. Application Data

(60) Provisional application No. 62/659,041, filed on Apr. 17, 2018.

(51) Int. Cl.
*G06K 9/62* (2006.01)
*A01B 79/00* (2006.01)
(Continued)

(52) U.S. Cl.
CPC ........... *A01B 79/005* (2013.01); *G06K 9/624* (2013.01); *G06T 7/136* (2017.01); *G06T 7/90* (2017.01);
(Continued)

(58) Field of Classification Search
CPC .... A01B 79/005; G06K 9/624; G06K 9/4652; G06K 9/00664; G06T 7/90; G06T 7/136;
(Continued)

(56) References Cited

U.S. PATENT DOCUMENTS 6,937,939 B1   8/2005   Shibusawa et al.
9,147,255 B1   9/2015   Zhang et al.
(Continued)

FOREIGN PATENT DOCUMENTS

WO    WO2017-181127 A1    10/2017

OTHER PUBLICATIONS

Notification of and the International Preliminary Report on Patentability Chapter II for PCT/US2019/021558; dated Nov. 20, 2019.
(Continued)

*Primary Examiner* — Phuoc Tran
(74) *Attorney, Agent, or Firm* — Tope-McKay & Associates (57) ABSTRACT

Described is a system for determining crop residue fraction. The system includes a color video camera mounted on a mobile platform for generating a two-dimensional (2D) color video image of a scene in front or behind the mobile platform. In operation, the system separates the 2D color video image into three separate one-dimensional (1D) mixture signals for red, green, and blue channels. The three 1D mixture signals are then separated into pure 1D component signals using blind source separation. The 1D component signals are thresholded and converted to 2D binary, pixel-level abundance maps, which can then be integrated to allow the system to determine a total component fractional abundance of crop in the scene. Finally, the system can control a mobile platform, such as a harvesting machine, based on the total component fractional abundance of crop in the scene.

9 Claims, 5 Drawing Sheets

(51) Int. Cl.
*G06T 7/90* (2017.01)
*G06T 7/136* (2017.01)

(52) U.S. Cl.
CPC ............. *G06T 2207/10016* (2013.01); *G06T 2207/10024* (2013.01); *G06T 2207/30188* (2013.01); *G06T 2207/30252* (2013.01)

(58) Field of Classification Search
CPC . G06T 2207/30252; G06T 2207/10016; G06T 2207/10024; G06T 2207/30188; G06T 7/62; G06T 7/11
See application file for complete search history.

(56) References Cited

U.S. PATENT DOCUMENTS 10,475,190 B2 * 11/2019 Sarkar .................. G06T 5/20
2003/0161527 A1 * 8/2003 Wang ................... G06T 7/0012
  382/156
2006/0115158 A1 6/2006 Sunshine et al.
2018/0076795 A1 3/2018 Petre et al.

OTHER PUBLICATIONS

S. Aich et al., "DeepWheat: Estimating Phenotypic Traits from Crop Images with Deep Learning," 2018 IEEE Winter Conference on Applications of Computer Vision (WACV), Lake Tahoe, NV, 2018, pp. 323-332.
Notification of Transmittal of International Search Report and the Written Opinion of the International Searching Authority for PCT/US2019/021558; dated Jun. 24, 2019.
International Search Report of the International Searching Authority for PCT/US2019/021558; dated Jun. 24, 2019.
Written Opinion of the International Searching Authority for PCT/US2019/021558; dated Jun. 24, 2019.

* cited by examiner

SYSTEM AND METHOD FOR DETERMINING CROP RESIDUE FRACTION USING BLIND SOURCE SEPARATION OF COLOR IMAGES

CROSS-REFERENCE TO RELATED APPLICATIONS

This application claims the benefit of and is a non-provisional patent application of U.S. 62/659,041 filed on Apr. 17, 2018, the entirety of which is hereby incorporated by reference.

BACKGROUND OF INVENTION (1) Field of Invention

The present invention relates to system for determining crop residue and, more specifically, to a system for determining crop residue fraction using video imagery in real-time to control agricultural machinery.

(2) Description of Related Art

Crop residue measurements are often performed by farmers to assist farms in adapting their farming tractor operations based on changing field conditions. Currently, there are no low-cost sensing systems that can be mounted on a tractor for real-time measurements of crop residue to alter the operating characteristics of the machinery. Instead, ground-based crop residue measurements are currently performed using manual image analysis methods which cannot be used to control agricultural machinery. Although drones carrying multi-spectral cameras in visible and near infrared (NIR) bands are now being used for measuring water content and health of crops, they have not been used for measurements of crop residue amounts. This is largely because existing methods for analysis of crop residue are based on spectral models and use specific linear combinations of spectral features in the short-wave infrared (SWIR) wavelength range. Further, because measured residue spectra have high variability due to changes in water content, time since tillage, atmospheric water content, and lighting conditions, such model-based techniques are insufficiently accurate for ground-based estimation of residue ground coverage. SWIR hyperspectral cameras are also still too expensive and bulky for drone use. The high cost of SWIR hyperspectral cameras currently limits automated residue sensing to satellites and aircraft for wide area agricultural analysis.

Prior art methods for remote sensing crop residue measurements are based on measuring specific spectral features at specified wavelengths that are combined to generate indices indicative of the relative amounts of residue, such as the Cellulose Absorption Index (CM). Since the spectra of plants, residue, and soil depend strongly on conditions such as the dryness of materials and the elapsed time since tillage, calibrations must be performed. Even with calibration, uncertainties in the estimated residue levels are high using such spectral features.

Thus, a continuing need exists for an automated system that uses the color channels of a video camera to determine crop residue in real-time and control agricultural machinery based on the changing crop conditions.

SUMMARY OF INVENTION

This disclosure provides a system for determining crop residue fraction. In various aspects, the system includes a color video camera mounted on a mobile platform for generating a two-dimensional (2D) color video image of a scene in front or behind the mobile platform. Further, one or more processors and a memory are included. The memory is a non-transitory computer-readable medium having executable instructions encoded thereon, such that upon execution of the instructions, the one or more processors perform several operations, such as separating the 2D color video image into three separate one-dimensional (1D) mixture signals for red, green, and blue channels; separating the three 1D mixture signals into pure 1D component signals using blind source separation; thresholding and converting the 1D component signals to 2D binary, pixel-level abundance maps; and determining a total component fractional abundance of crop in the scene by integrating the abundance maps.

In another aspect, the system performs an operation of controlling the mobile platform based on the total component fractional abundance of crop in the scene.

In yet another aspect, the blind source separation is independent component analysis.

In another aspect, the abundance maps represent relative abundance levels of plant, plant residue, and soil in the scene in front of or behind the mobile platform.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for determining crop residue and, more specifically, to a system for determining crop residue fraction using video imagery in real-time to control agricultural machinery. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Next, specific details of various embodiment of the present invention are provided to give an understanding of the specific aspects. Finally, example implementations are provided with respect to controlling various devices using the system according to various embodiments of the present invention.

(1) Principal Aspects

Various embodiments of the invention include three "principal" aspects. The first is a system for determining crop residue fraction. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
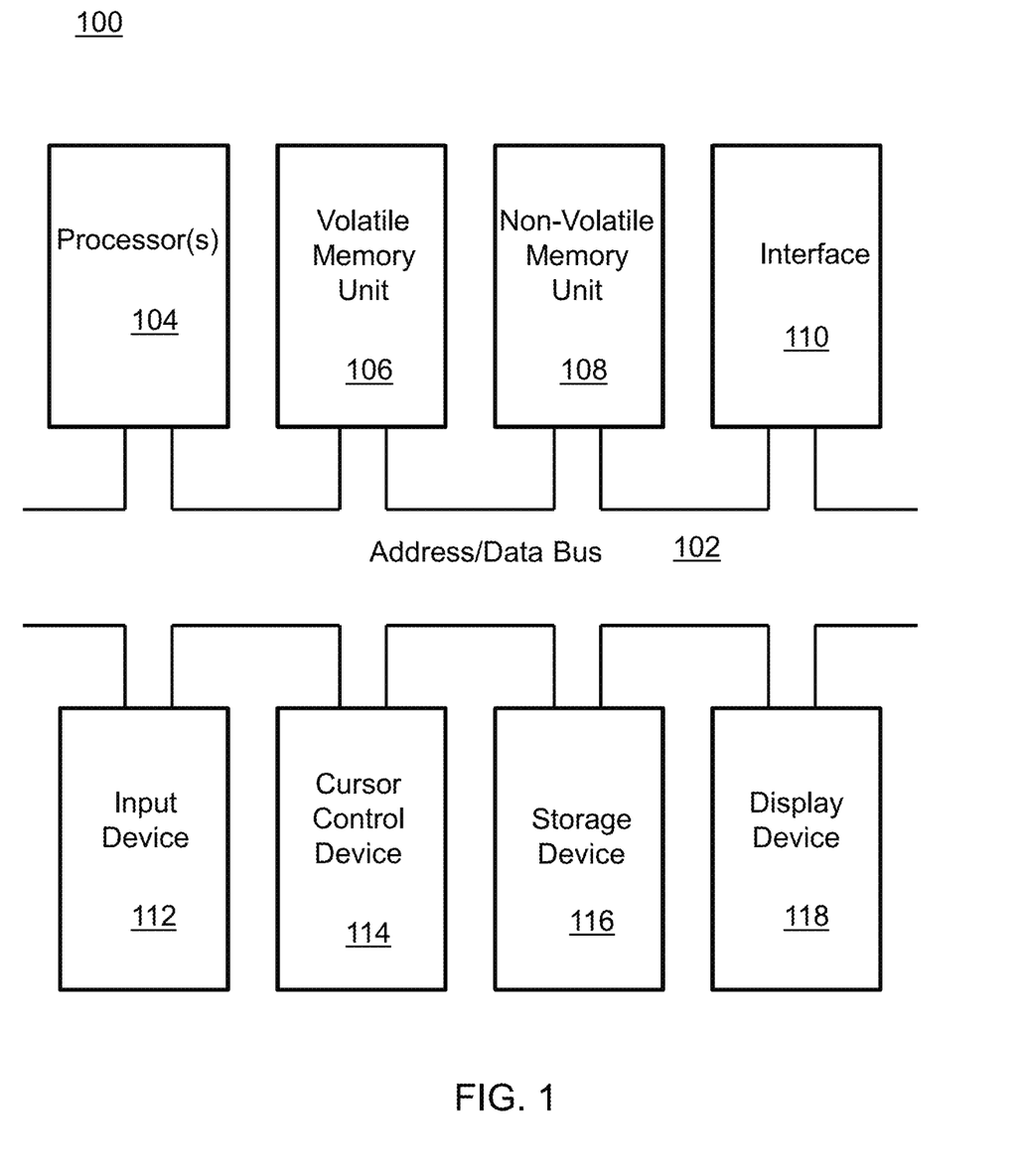
FIG. 1 is a block diagram depicting the components of a system according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
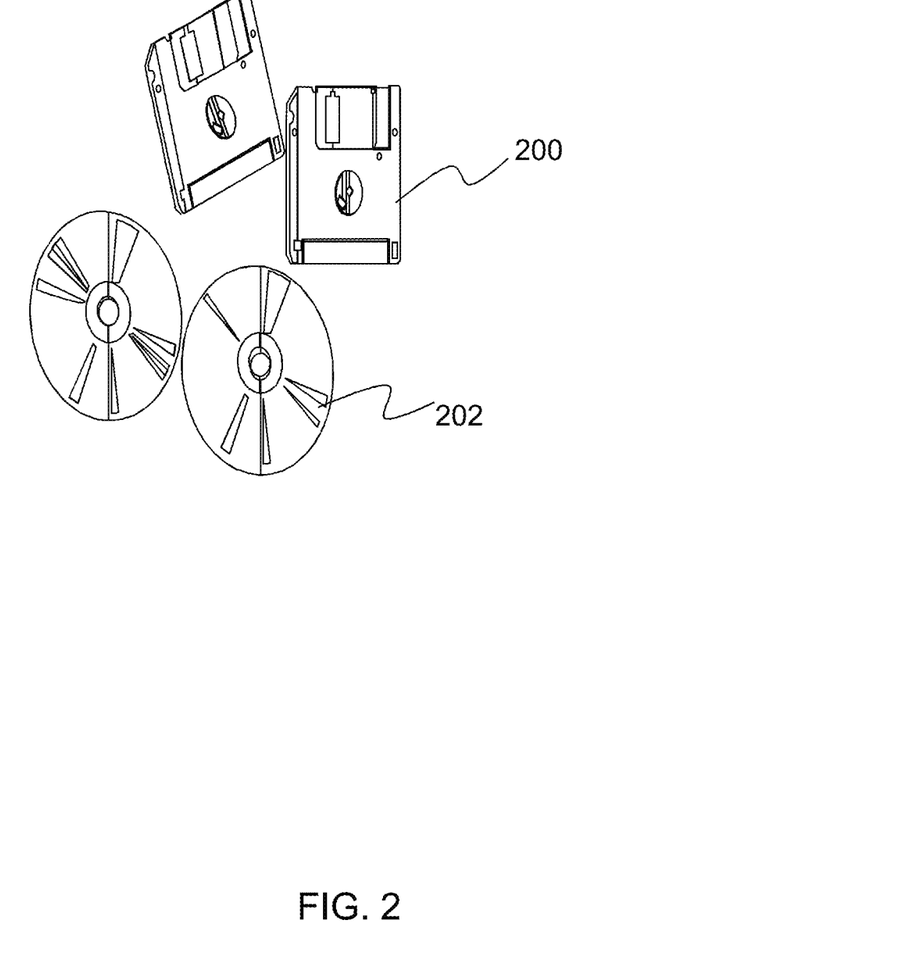
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

This disclosure provides a system and method for determining crop residue fraction using video imagery in real-time to control agricultural machinery or other devices and systems. For example, the system can be implemented using a color video camera mounted on a tractor or combine working in a farm field to determine the locations and amounts of plants, plant residues, and soil components visible in the video images. In such an aspect, the camera is pointed at the ground ahead of the tractor so that only plants, residues, and soil are visible in the video frames.

A unique aspect of the system resides in the interpretation of the red, green, and blue image frames as different mixtures of the components as defined by the different reflectivities of each component in different color frames. The components are assumed to be statistically independent so independent component analysis (ICA) can be used to separate the mixtures and segment each video frame into separate binary maps for each component. The fractional amounts of the components are determined by integrating the binary maps of the locations of plant, residue, and soil materials in image frames.

The binary maps are generated in real-time at the camera video rate and can be used to automatically adjust the tractor settings and adapt to changing conditions during operations in order to maximize crop yield. Currently no low-cost sensing system exists that can be mounted on a tractor for real-time measurements of crop residue relative amounts for adaptive control of the tractor operation. The present disclosure enables the use of such low-cost and reliable color video cameras to segment the video images into plant, residue, and soil components and determine their fractional amounts. In doing so, tractors and combines can be caused to automatically adapt their operation to changing farm field conditions and improve the quality and speed of tillage, seeding, and harvesting operations. It can also be used in any image analysis application where the image is constrained to contain regions of materials that are limited to a fixed set, have spatial variations or textures, and have different color properties. Specific details are provided below.

(3) Specific Details of Various Embodiments

As noted above, the present disclosure provides a system and method for determining crop residue fraction using video imagery in real-time to control agricultural machinery or other devices and systems. The system essentially operates as sensing system for analyzing crop fields. The system includes a color video camera mounted on a mobile platform (e.g., machinery such as a tractor, combine, etc.) that is pointed at the ground ahead of the moving mobile platform. Since the view is restricted to the ground ahead of the platform (e.g., the crop field), the video frames contain a small number of components which correspond to regions of different textures and colors (such as plants, residue, and soil). If the components do not spatially overlap, then the pixel values for each component are statistically independent of other components. A key aspect of this invention is that since the components have different relative reflectivities in the red, green, and blue frames or color channels defined by the color filters installed on the video sensor, each color channel can be considered to be a different mixture of the plant, residue, and soil spatial image components.

Independent component analysis (ICA) can be used to separate the mixtures into components if each two-dimensional (2D) color channel image is converted into a one-dimensional (1D) mixture signal. The set of mixture signals are then used as inputs to ICA. ICA is a form of blind source separation (BSS) that separates signal mixtures into components by maximizing the statistical independence of the ICA outputs. The separated 1D signal components are then reformatted back into 2D image components and thresholded to create segmented binary maps that represent the spatial distributions of the plant, residue, and soil components. The fractional abundances of the components can be measured by integrating the binary maps. In other words, the ICA outputs are the segmentations of the image into plant, residue, and soil components. For example, the plant component ICA output is an image that contains the plant regions and is dark or low-valued in the non-plant regions. Therefore, by thresholding the component image, a binary map of the plant spatial distribution can be generated. The plant, residue, and soil spatial distributions are obtained using the invention.

Since ICA is a blind method that does not utilize prior knowledge of the component properties, the ICA-based residue measurement system does not require calibration and it automatically adapts to changing conditions or properties of the components. Other advantages of the system include the fact that no image or machine vision processing, such as edge detection, is required and the only adjustable parameters are the threshold values for the binary maps.

Figure 3:
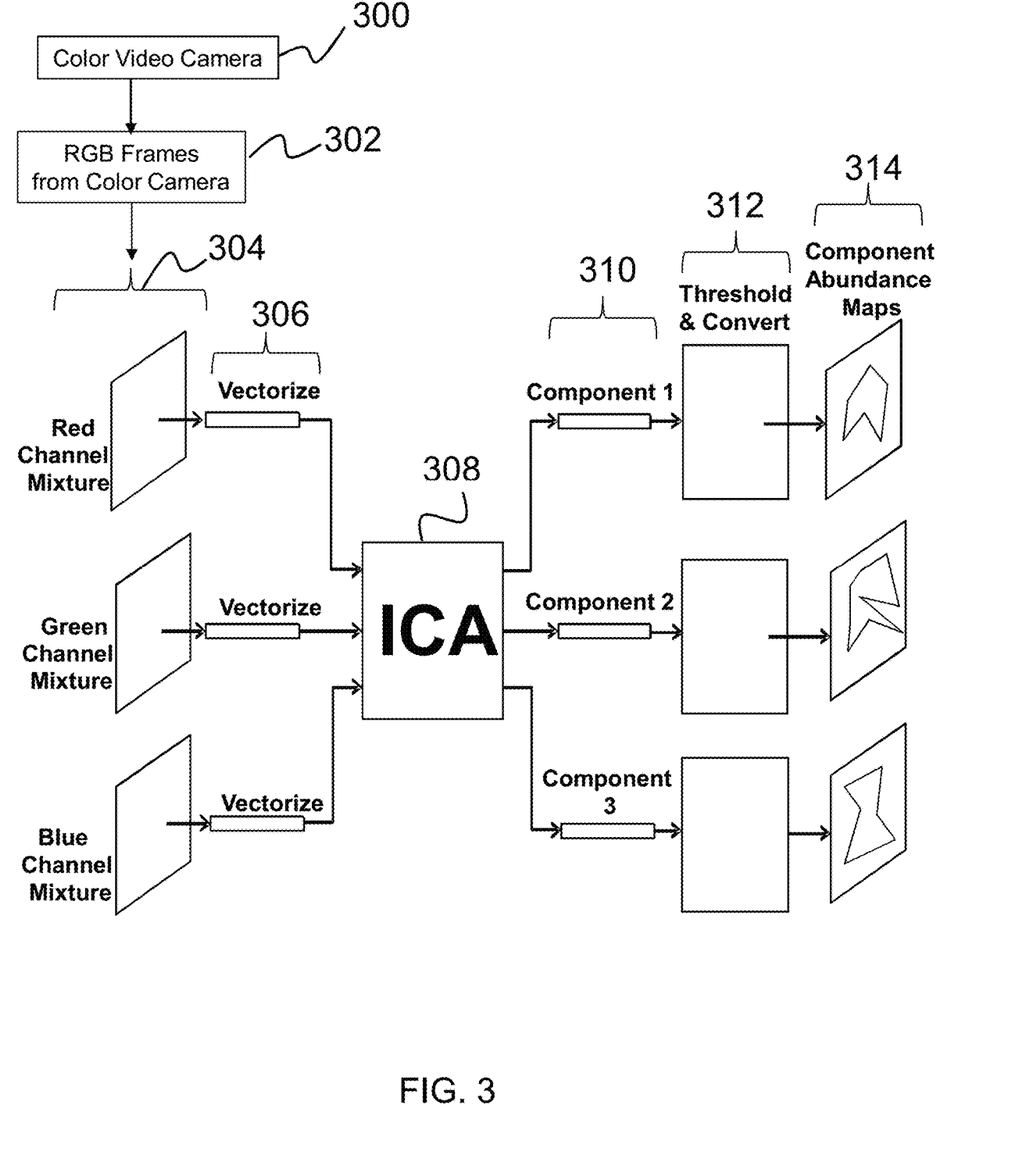
FIG. 3 is a flowchart illustrating a process for measurement of image component abundances using independent component analysis (ICA) of video camera color channels according to various embodiments of the present invention.

A system flow diagram is shown in FIG. 3. The system starts with the 2-D RGB color images 302 as received from the video camera 300 as mounted on the mobile platform. The 2D RGB color images 302 are separated into three 1D mixture signals 304 for the red, green, and blue channels. As noted above, the three color channels 304 are defined by color filters installed on the video sensor, which in essence separates each 2D RGB color image 302 into three 2D color channel images 304 (or color channels). In a desired aspect, the camera is a conventional color video camera where the color filters are mounted on the image sensor chip. Each color channel image 304 will be a different mixture of the image components. Each 2D color channel image 304 is then vectorized 306 or converted into a 1D signal vector by concatenating the rows or columns of the image.

Blind source separation 308 (such as independent component analysis (ICA), etc.) is then used to blindly separate the vectorized mixture signals 306 into pure independent component signals 310. A pure component signal in this case is a 1D representation of the soil, residue, or plant regions in the 2D input image.

The 1D component signals 310 are then thresholded and converted 312 back to 2D binary pixel-level abundance maps 314. The component signals 310 are thresholded and converted 312 to 1D binary signals by setting all values above a threshold to 1 and all values below the threshold to 0. Further, once thresholded, the 1D binary signals are converted back to 2D binary pixel-level abundance maps 314 of residue, plants, and soil by reversing the concatenation processing by dividing the signals into rows or columns and stacking them.

The 2D binary pixel-level abundance maps 314 (or component abundance maps) are then integrated to estimate the total component fractional abundances. This separate abundance maps 314 are integrated by simply summing all values in the 2D binary abundance maps 314 and dividing the sum by the total number of pixels in the image. This results in the component fractional abundance associated with each abundance map.

Based on the binary abundance maps 314, the various areas in front of the mobile platform are classified as either containing plants, crop residue, or soil. This is accomplished by classifying each pixel as plant, residue, or soil depending on which binary abundance map is nonzero at that pixel.

Figure 4:
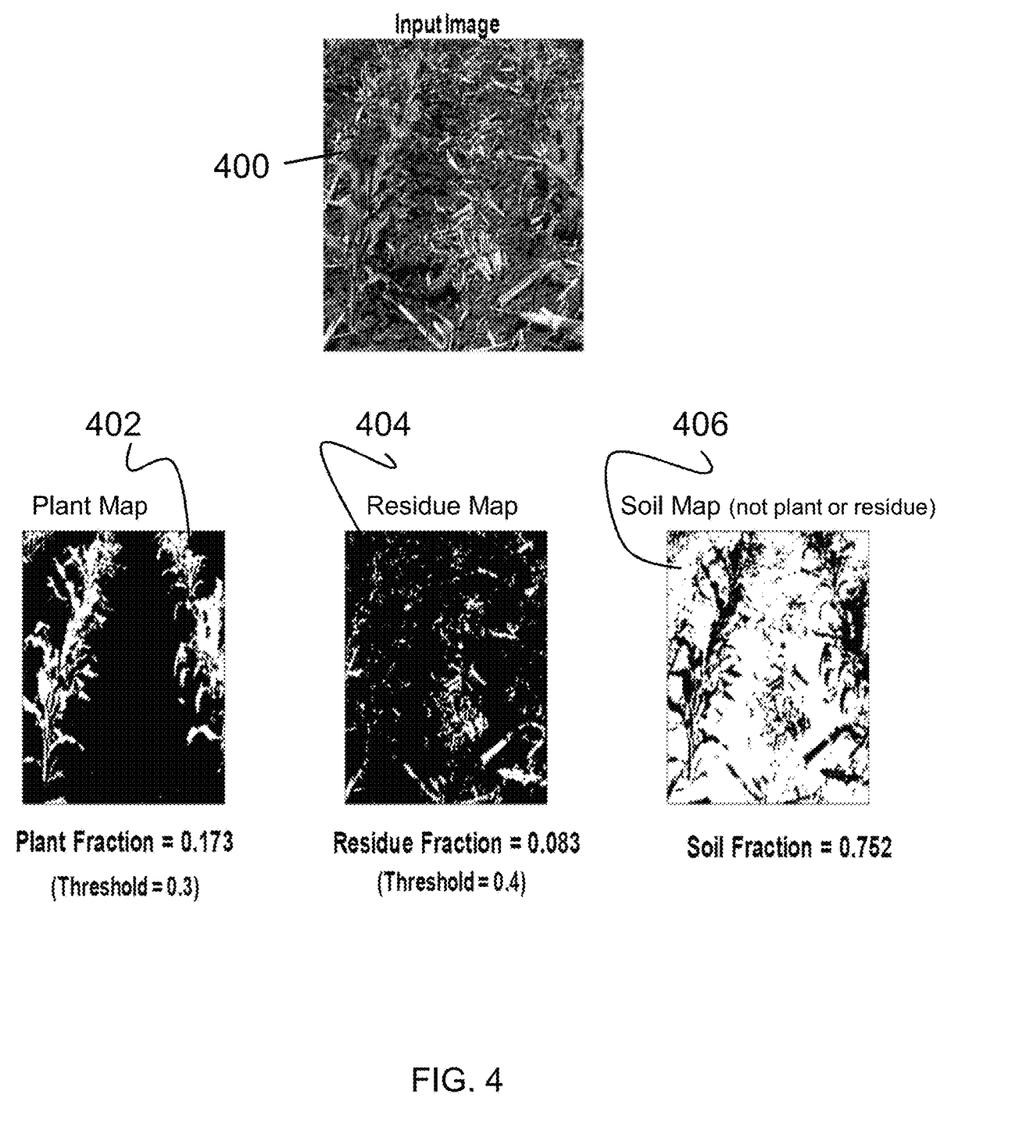
FIG. 4 is an illustration depicting example determinations of ICA-based plant, crop residue, and soil image segmentation according to various embodiments of the present invention.

For demonstrative purposes, the system of the present disclosure was implemented and reduced to practice using an input color image containing plants, crop residue, and soil and the JADE implementation of ICA. FIG. 4 illustrates the color image input 400 and the resulting binary abundance maps 402, 404, and 406 generated using this invention and corresponding to plants, residue, and soil, respectively. In this example, the soil abundance map 406 indicates that the soil fraction is approximately 75.2%, while the plant 402 and residue 404 abundance maps indicate that the plant and residue fractions are 17.3% and 8.3%, respectively. As can be appreciated by those skilled in the art, such detailed knowledge of soil conditions can be used by farmers and other operators in adapting farming tractor operations (or other applicable equipment) based on changing field conditions.

(4) Control of a Device

Figure 5:
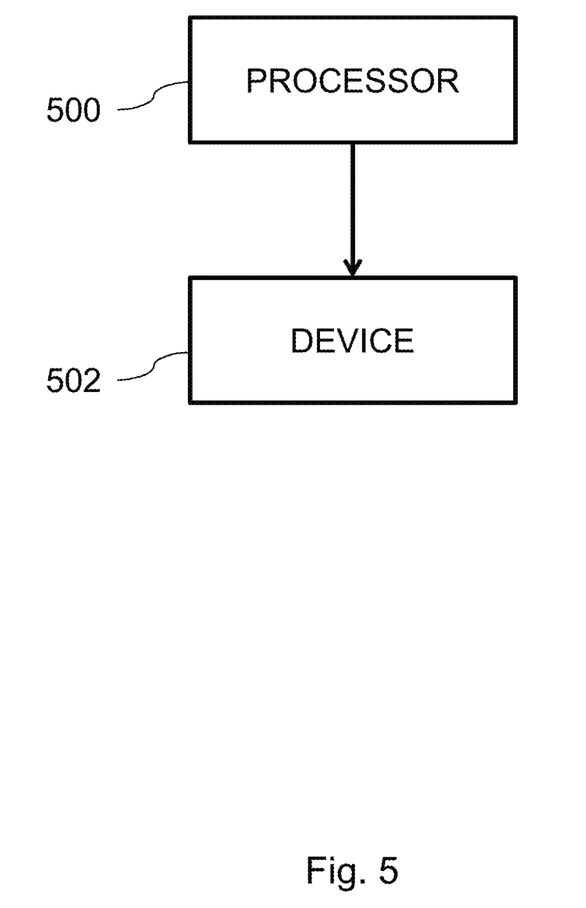
FIG. 5 is a block diagram depicting control of a device according to various embodiments.

As shown in FIG. 5, a processor 500 may be used to control a device 502 (e.g., a mobile platform such as agriculture machinery, including a tractor or turbine, etc.) based on determining the soil conditions in front or behind the mobile platform. By monitoring the plant and crop residue fractions, the tillage, seeding, and harvesting machine settings can be adjusted to obtain the optimal fractional coverage of residue or plants for each operation. For example, the forward speed, angle, and weight of the disk harrow used for tillage can be adjusted based on the amount of residue left on the surface after tillage. As understood by those skilled in the art, an optimal amount of residue (e.g., as set by an operator or pre-programmed given the use and conditions) will enable retention of moisture while still permitting seeds to be inserted at the proper depth in the soil. Thus, as understood by those skilled in the art, the various features of the disk harrow can be adjusted based on the residue.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for determining crop residue fraction, the system comprising:
    a color video camera mounted on a mobile platform for generating a two-dimensional (2D) color video image of a scene in front or behind the mobile platform;
    one or more processors and a memory, the memory being a non-transitory computer-readable medium having executable instructions encoded thereon, such that upon execution of the instructions, the one or more processors perform operations of:
        separating the 2D color video image into three separate one-dimensional (1D) mixture signals for red, green, and blue channels;
        separating the three 1D mixture signals into pure 1D component signals using independent component analysis;
        thresholding and converting the 1D component signals to 2D binary, pixel-level abundance maps; and
        determining a total component fractional abundance of crop in the scene by integrating the abundance maps.
2. The system as set forth in claim 1, further comprising an operation of controlling the mobile platform based on the total component fractional abundance of crop in the scene.

3. The system as set forth in claim 1, wherein the abundance maps represent relative abundance levels of plant, plant residue, and soil in the scene in front of or behind the mobile platform.

4. A computer program product for determining crop residue fraction, the computer program product comprising:
 a non-transitory computer-readable medium having executable instructions encoded thereon, such that upon execution of the instructions by one or more processors, the one or more processors perform operations of:
  receiving a two-dimensional (2D) color image of a scene in front or behind a mobile platform;
  separating the 2D color video image into three separate one-dimensional (1D) mixture signals for red, green, and blue channels;
  separating the three 1D mixture signals into pure 1D component signals using independent component analysis;
  thresholding and converting the 1D component signals to 2D binary, pixel-level abundance maps; and
  determining a total component fractional abundance of crop in the scene by integrating the abundance maps.

5. The computer program product as set forth in claim 4, further comprising an operation of controlling the mobile platform based on the total component fractional abundance of crop in the scene.

6. The computer program product as set forth in claim 4, wherein the abundance maps represent relative abundance levels of plant, plant residue, and soil in the scene in front of or behind the mobile platform.

7. A computer implemented method for determining crop residue fraction, the method comprising an act of:
 causing one or more processors to execute instructions encoded on a non-transitory computer-readable medium, such that upon execution, the one or more processors perform operations of:
  receiving a two-dimensional (2D) color image of a scene in front or behind a mobile platform;
  separating the 2D color video image into three separate one-dimensional (1D) mixture signals for red, green, and blue channels;
  separating the three 1D mixture signals into pure 1D component signals using independent component analysis;
  thresholding and converting the 1D component signals to 2D binary, pixel-level abundance maps; and
  determining a total component fractional abundance of crop in the scene by integrating the abundance maps.

8. The method as set forth in claim 7, further comprising an operation of controlling the mobile platform based on the total component fractional abundance of crop in the scene.

9. The method as set forth in claim 7, wherein the abundance maps represent relative abundance levels of plant, plant residue, and soil in the scene in front of or behind the mobile platform.

\* \* \* \* \*